(12) United States Patent
Thomas (10) Patent No.: US 7,234,266 B2
(45) Date of Patent: Jun. 26, 2007

(54) ADJUSTABLE FISHING LURE AND METHOD OF MANUFACTURING THE LURE

(76) Inventor: John C. Thomas, 8705 Hickorywood La., Tampa, FL (US) 33615

( * ) Notice: Subject to any disclaimer, the term of this patent is extended or adjusted under 35 U.S.C. 154(b) by 0 days.

(21) Appl. No.: 11/134,645

(22) Filed: May 20, 2005

(65) Prior Publication Data
US 2006/0260177 A1  Nov. 23, 2006

(51) Int. Cl.
  *A01K 85/00* (2006.01)
(52) U.S. Cl. .................. 43/42.24; 43/42.45; 43/42.47; 43/42.36; 43/42.02; 43/42.08
(58) Field of Classification Search ............... 43/42.02, 43/42.45, 42.47, 42.08, 42.24, 42.39, 42.36
See application file for complete search history.

(56) References Cited

U.S. PATENT DOCUMENTS

| | | | | |
|---|---|---|---|---|
| 2,187,609 | A | * | 1/1940 | Larson ....................... 43/42.35 |
| 2,243,663 | A | * | 5/1941 | Warcham .................... 43/42.08 |
| 2,288,009 | A | * | 6/1942 | Matasy et al. .............. 43/42.36 |
| 2,659,175 | A | * | 11/1953 | Carpenter ................... 43/42.09 |
| 2,776,518 | A | * | 1/1957 | Felmlee ...................... 43/42.24 |
| 2,938,293 | A | * | 5/1960 | Richardson ................ 43/42.24 |
| 3,091,883 | A | * | 6/1963 | Hufford ...................... 43/42.08 |
| 3,122,852 | A | * | 3/1964 | Bocchino ................... 43/42.08 |
| 3,203,132 | A | * | 8/1965 | Kotis ......................... 43/42.24 |
| 3,541,718 | A |   | 11/1970 | Norman |
| 3,744,175 | A |   | 7/1973 | Bellah et al. |
| 3,922,811 | A |   | 12/1975 | Ellingson |
| 4,126,956 | A |   | 11/1978 | Bayer |
| 4,141,171 | A |   | 2/1979 | Muddiman |
| 4,337,591 | A |   | 7/1982 | Gell et al. |
| 4,573,283 | A | * | 3/1986 | Pippert ...................... 43/42.09 |
| 4,794,720 | A |   | 1/1989 | Robertaccio |
| 5,070,639 | A | * | 12/1991 | Pippert ...................... 43/42.31 |
| 5,170,579 | A |   | 12/1992 | Hollinger |
| 5,600,916 | A |   | 2/1997 | Smith |
| 5,953,849 | A |   | 9/1999 | Boucher, Jr. |
| 6,006,467 | A |   | 12/1999 | Ulrich |
| 6,578,313 | B1 |   | 6/2003 | Knol |
| 6,910,295 | B2 | * | 6/2005 | Nakahashi ................. 43/42.15 |
| 2003/0084602 | A1 |   | 5/2003 | Reed |
| 2005/0044771 | A1 |   | 3/2005 | Burggrabe et al. |

* cited by examiner

*Primary Examiner*—Kurt Rowan
(74) *Attorney, Agent, or Firm*—Larson & Larson; Frank Liebenow (57) ABSTRACT

The present invention provides an adjustable fishing lure that has a flexible body and an integrated bendable stay that lets the user bend the body into a specific shape for the purpose of changing the action of the lure. The body of the lure can be bent and will remain in a bent configuration, causing the lure to travel at different water depths as it is pulled through the water.

10 Claims, 6 Drawing Sheets

FIG. 1

PRIOR ART

FIG. 2

PRIOR ART

ADJUSTABLE FISHING LURE AND METHOD OF MANUFACTURING THE LURE

BACKGROUND OF THE INVENTION

1. Field of the Invention

This invention relates to the field of fishing lures and more particularly to a fishing lure with an adjustable travel depth.

2. Description of the Prior Art

Conventional fishing lures generally travel at a specific depth in the water, depending upon various parameters, including buoyancy (e.g., specific gravity), materials, shape, surface components and angles and the speed at which they travel through water. One such lure described in US Published Patent Application No. 2005/0044771 to Burggrabe describes a lure that dives to reach fish at greater depths. This published patent application is hereby included by reference. This, and other prior art, provide for a lure that will use aerodynamic principles to cause the lure to travel at greater depths as it is pulled through the water, e.g., during trolling. This class of lures has a specific depth at which it travels for a given speed without a way to adjust the depth. Therefore, when moving at a specific speed, the lure will travel at a certain approximate depth, even though it may be desirable for the lure to travel at a shallower or deeper level, for instance when it is known at which depth the target fish are traveling.

What is needed is a fishing lure that can be adjusted to travel at an appropriate depth.

SUMMARY OF THE INVENTION

In one embodiment, an adjustable fishing lure is disclosed with a lure body made from a flexible material and having a front end and a back end plus a diving lip extending from the front end. A bendable stay is disposed within the lure body, the bendable stay has a line receiving loop at an end extending beyond the front end of the lure body and a hook receiving loop at an end extending beyond the back end of the lure body. The bendable stay provides for bending the lure body, and the lure body maintains a bent shape.

In another embodiment, a method of manufacturing an adjustable fishing lure is disclosed. The method includes molding a lure body using a bendable foam, the lure body has a front section and a back section and the front section has a slit for accepting a diving lip and a hole for accepting a bendable stay. The back section has an upper section that is bifurcated from a lower section. A bonding agent is placed on the end of a diving lip and the end of the diving lip is inserted into the slit in the lure body. A bendable stay is inserted into the hole so that a front end of the bendable stay having a line receiving loop extends beyond the front section of the lure body, and a back portion of the bendable stay lays substantially flat between the upper section of the lure body and the lower section of the lure body and a hook receiving loop is disposed at a back end of the bendable stay extends beyond a back end of the lure body. The inside surface of the back section of the lure body is coated with a second bonding agent and pressure is applied to the outside surface of the lower body and the upper body to achieve contact between the inside surfaces until the second bonding agent cures.

In another embodiment, an adjustable fishing lure is disclosed with a lure body made from a flexible material, the lure body has a front end and a back end and at least one action controlling surface. A bendable stay is disposed within the lure body and the bendable stay provides for bending the lure body and the lure body maintains a bent shape.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Reference will now be made in detail to the presently preferred embodiments of the invention, examples of which are illustrated in the accompanying drawings. Throughout the following detailed description, the same reference numerals refer to the same elements in all figures.

Figure 1:
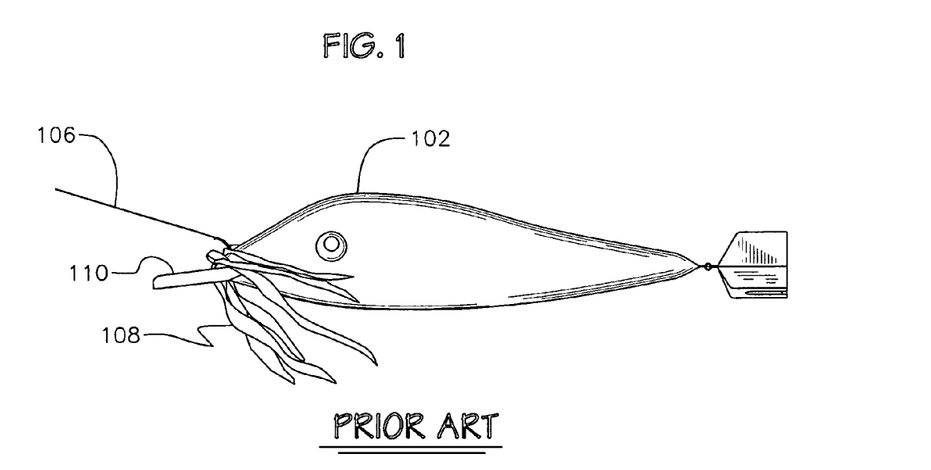
FIG. 1 illustrates a lure of the prior art.
Figure 2:
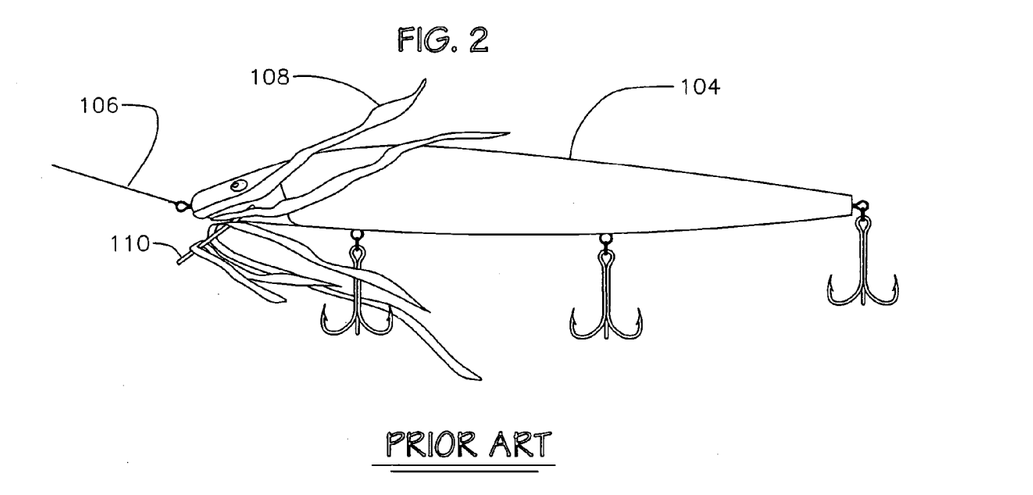
FIG. 2 illustrates a lure of the prior art.

Referring to FIG. 1, a lure of the prior art is shown. The lure 102 may be made from a hard or soft material and be stiff or flexible. A fishing line 106 is attached and weeds 108 have accumulated between the fishing line 106 and the diving lip 110. In FIG. 2, a different lure 104 is shown. The lure 104 may be made from a hard or soft material and be stiff or flexible. A fishing line 106 is attached and weeds 108 have accumulated between the fishing line 106 and the diving lip 110.

Figure 3:
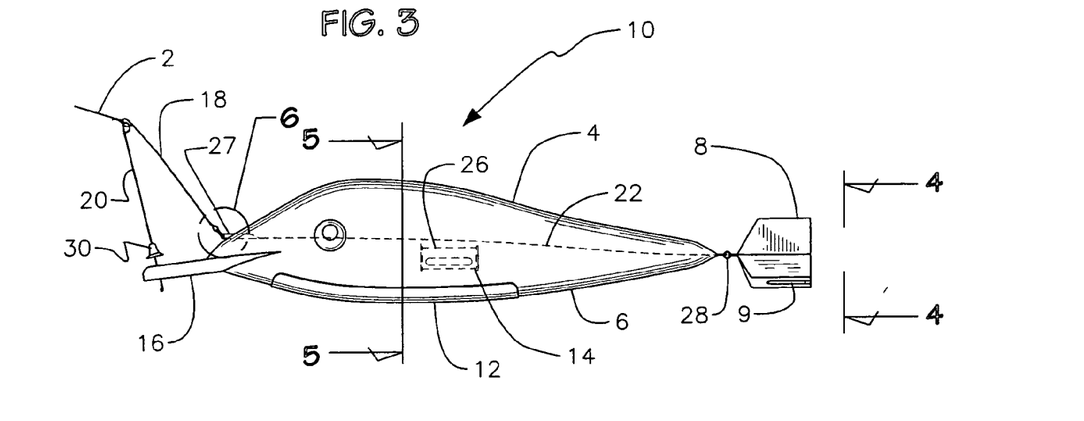
FIG. 3 illustrates a side view of a fishing lure of one embodiment of the present invention.

Referring to FIG. 3, an adjustable fishing lure 10 in accordance with one embodiment of the present invention is shown. The adjustable fishing lure 10 has a flexible upper body section 4 and a flexible lower body section 6. In this embodiment, the body is molded as a single piece of a flexible material. In some embodiments, the flexible material is a bendable foam or elastomer such as urethane foam. In another embodiment, the body is made in two pieces, a top half and a bottom half. A diving lip 16 is affixed between the upper body section 4 and lower body section 6 and extends outward from the front end of the body. The diving lip 16 is an action controlling surface, in that it causes the adjustable fishing lure 10 to react to movement through water, in this case adjusting the traveling depth. The diving lip 16 is bonded to the body of the adjustable fishing lure 10 by, for example, ultrasonic welding or an adhesive such as epoxy. In some embodiments, the diving lip 16 is made of a plastic material and in some embodiments it is made of metal such as brass or copper.

A bendable stay 22 has a front end 27 and a back end 28. The bendable stay 22 passes through a hole in the upper body towards the front of the adjustable fishing lure 10 and rests between the upper body section 4 and the lower body section 6 towards the middle and back of the adjustable fishing lure 10. In some embodiments, the bendable stay 22 lies substantially flat between the upper body section 4 and the lower body section 6. The front end 27 of the bendable stay 22 extends outside the front of the lure where the fishing line or lure end of the line receiving wire 18 is attached through a line receiving loop 270 that, in some embodiments, is a hole in the front end 27 of the bendable stay 22. The back end 28 of the bendable stay 22 extends outside the back of the body of the adjustable fishing lure 10 and has a hook receiving loop that, in some embodiments, is a second hole 280 to which a hook 9 is provided. In this embodiment, a weed less hook 9 is shown with a foam rubber weed guard 8 for reducing the amount of weeds getting caught on the hook(s) during usage. In other embodiments, a single or multi-hook is attached to the hook receiving loop 280. In some embodiments, a hook 9 without a foam rubber weed guard is attached to the hook receiving loop 280. The bendable stay 22 is made of a material such as steel that will permit bending and hold the bent shape. Therefore, when configured between the flexible upper body section 4 and the flexible lower body section 6, the body section will respond to bending by staying substantially as bent. The bend will change the arc of the lure's back and change the adjustable fishing lure's 10 action such as keeping the adjustable fishing lure 10 on the surface or sending the adjustable fishing lure 10 below the surface to an approximate depth. In some embodiments, the bendable stay 22 is twisted approximately 90 degrees so that the line receiving loop 270 is orientated in a vertical direction and the hook receiving loop 280 is oriented in a horizontal direction and the portion of the bendable stay 22 passing between the upper body section 4 and the lower body section 6 lay substantially flat between the flexible upper body section 4 and the flexible lower body section 6.

Figure 3A:
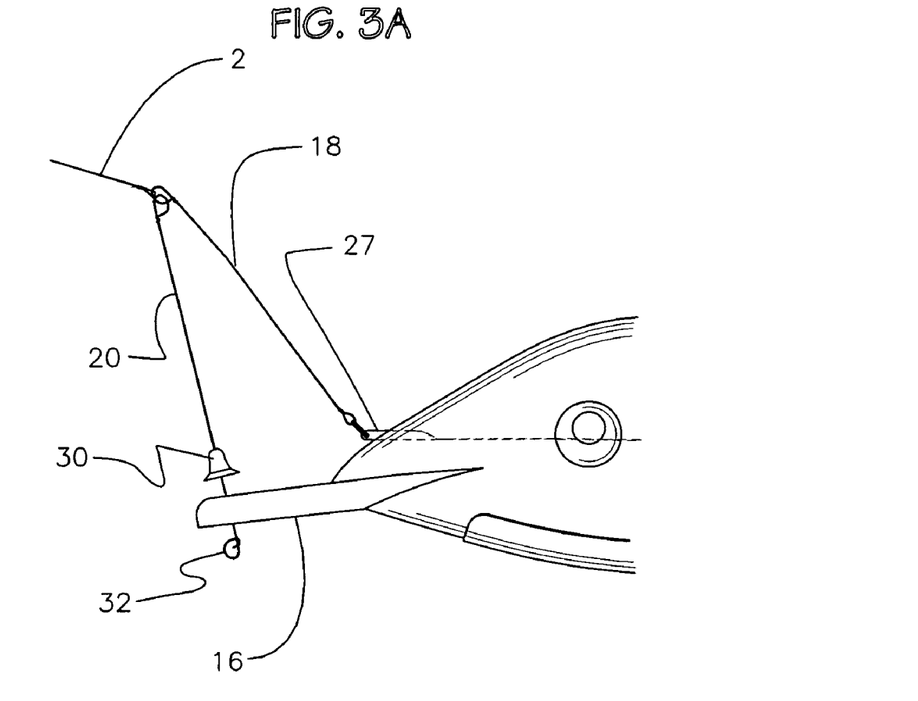
FIG. 3a illustrates a side view of a fishing lure of a second embodiment of the present invention.
Figure 3B:
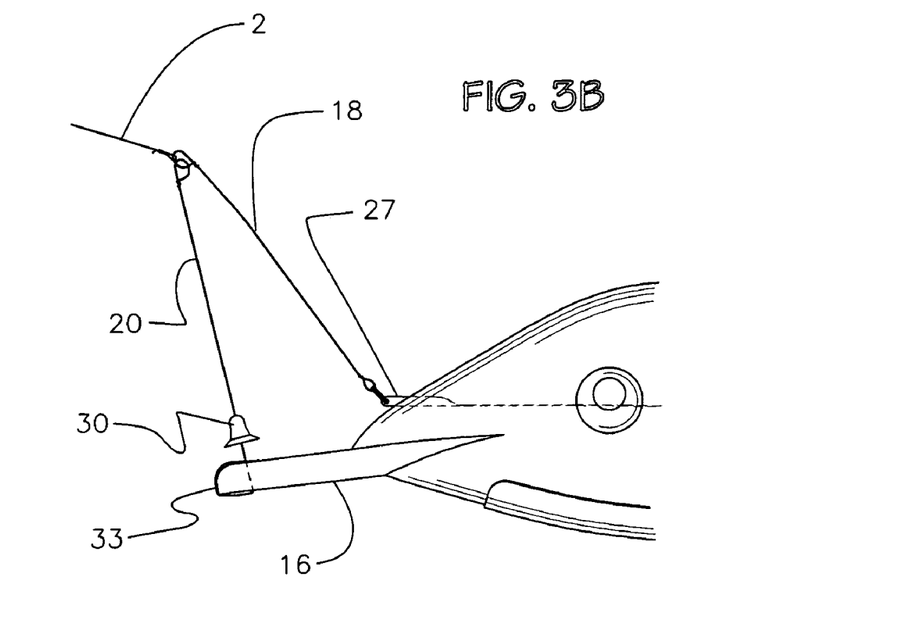
FIG. 3b illustrates a side view of a fishing lure of a third embodiment of the present invention.

The line receiving wire 18 has a loop for attaching a fishing line 2 at the line end of the line receiving wire 18. In some embodiments a weed guard wire 20 is connected to the line receiving wire at the same loop where the fishing line 2 is attached. The weed guard wire 20 has a free end that passes through a hole in the diving lip 16. The diameter of the hole is larger than the diameter of the weed guard wire 20 so as to permit free movement of the weed guard wire 20 within the hole. The weed guard wire 20 may be kept in place by a loop 32/34 in the end that passes through the hole in the diving lip 16 or it may be kept in place by making it longer than the line receiving wire 18, long enough to prevent it from exiting the hole in the diving lip 16 when the line receiving wire 18 is rotated in any direction. In FIG. 3a, the weed guard wire 20 is kept in place with a loop in the end at the end that passes through the diving lip 16. Although shown as a rounded loop 32, the shape can be any shape that keeps the weed guard wire 20 from exiting through the hole in the diving lip 16. In FIG. 3b, the weed guard wire 20 is kept in place with a loop that passes around the diving lip 16 and wraps around the weed guard wire at a point between the line receiving wire 18 and the diving lip 16. The line receiving wire 18 is made from a stiff material that permits some bending, for example steel. In some embodiments, a weed guard hat 30 is provided such that the weed-guard wire 20 passes through the weed guard hat 30. The weed guard hat fills the L-shaped space where by the weed guard wire 20 meets the diving lip 16, helping to reduce weed retention at this point. The weed guard hat has a hole approximately through its center and the hole has a diameter greater than the diameter of the weed guard wire 20 so that the weed guard hat 30 freely moves up and down on the weed guard wire 20, thereby allowing gravity to keep the weed guard hat 30 sitting upon the diving lip 16 as the weed guard wire 20 moves up and down through the diving lip 16.

In some embodiments, a lower body weight 12 is affixed to the lower body section 6 to help submerge the adjustable fishing lure 10. The lower body weight 12 is made from a metal such as steel, copper, brass or the like, and is bonded to the lower body section 6 with an adhesive. Although not required, it is preferred that the visible side of the lower body weight be a polished, shinny material, perhaps plated with chrome or the like, so as to attract the target fish.

Figures 5, 6, 7, 8:
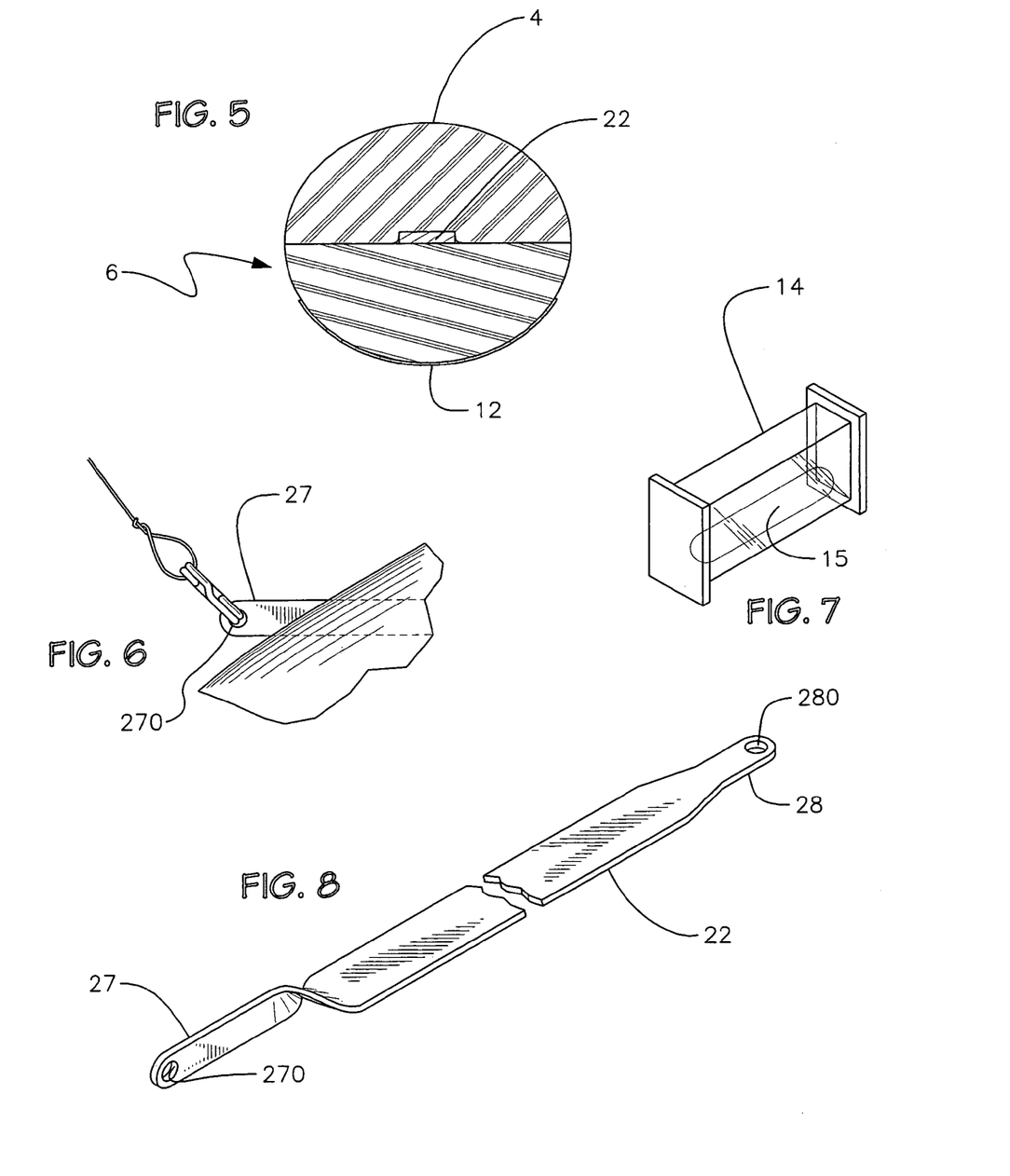
FIG. 5 illustrates a cross-sectional view of the top body section and bottom body section of a fishing lure of the first three embodiments of the present invention.
FIG. 6 illustrates the line attachment to a fishing lure of the first three embodiments of the present invention.
FIG. 7 illustrates a weight of a fourth embodiment of the present invention.
FIG. 8 illustrates the bendable stay of a fishing lure of the first three embodiments the present invention.

In some embodiments, a weight 14 is disposed within the body of the adjustable fishing lure 10 in a cavity 26 of the lower body section 6 of the adjustable fishing lure 10. The weight helps to keep the adjustable fishing lure 10 submerged during use. In some embodiments, the weight 14 includes a mass 15 housed in a hard box as shown in FIG. 5, forming a rattle that will make noise as the lure travels through water, thereby providing additional stimulus to attract the target fish. The box is made from a hard material such as plastic, for example, Styrofoam plastic.

Figure 4:
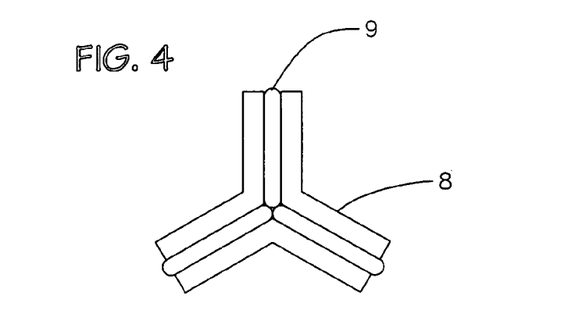
FIG. 4 illustrates a back view of a treble hook of a fishing lure of the first three embodiments of the present invention.

Referring now to FIG. 4, a back view of a fishing lure of the first three embodiments of the present invention is shown, detailing the weed guard 8 that covers the hook 9. The weed guard 8 is made of a soft, pliable material such as foam rubber and covers the hook 9, in this example a triple hook, helping to prevent weeds from getting caught in the arc of the hook. In some embodiments, the front edge of the weed guard 8 tapers from front to back forming an angle that helps keep weeds from catching on the front surface of the weed guard 8.

Referring now to FIG. 5, a cross-sectional view of the top body section and bottom body section of a fishing lure of the first three embodiments of the present invention is shown. The bendable stay 22 is sandwiched between the top body section 4 and the bottom body section 6.

Referring now to FIG. 6, the line attachment to a fishing lure of the first three embodiments of the present invention is shown. In this, the front end 27 of the bendable stay 22 extends far enough through the upper body section 4 of the adjustable fishing lure 10, exposing the line receiving loop 270 to which the line receiving wire 18 is attached. In some embodiments, the fishing line 2 is attached directly to the line receiving loop 270 instead of having a line receiving wire 18.

Referring now to FIG. 7, a weight of a fourth embodiment of the present invention is shown. The weight 14 is an enclosure that is larger than the mass 15 and the mass 15 is disposed within the weight 14, thereby permitting the mass 15 to move freely within the weight 14, emitting sound as it hits or rubs against the walls of the rattle. The weight 14 is made of a hard material such as hard plastic or metal and the mass 15 is made of a heavy material such as iron or lead. In some embodiments, there are multiple, smaller masses 15.

Referring now to FIG. 8, the bendable stay of a fishing lure of the first three embodiments the present invention is shown. The bendable stay 22 has a front end 27 including a line receiving loop 270 for attachment of a fishing line or the line receiving wire 18. The back end 28 of the bendable stay 22 has a hook receiving loop 280 for attaching a hook. In some embodiments, the bendable stay 22 has an approximately 90 degree twist toward the front end 27, thereby controlling the bending action so that when installed within the adjustable fishing lure 10, upward or downward bending will affect the back majority of the adjustable fishing lure 10 but not affect the front minority of the adjustable fishing lure 10, making the front end 27 substantially vertical and the back end 28 substantially horizontal.

Figure 9:
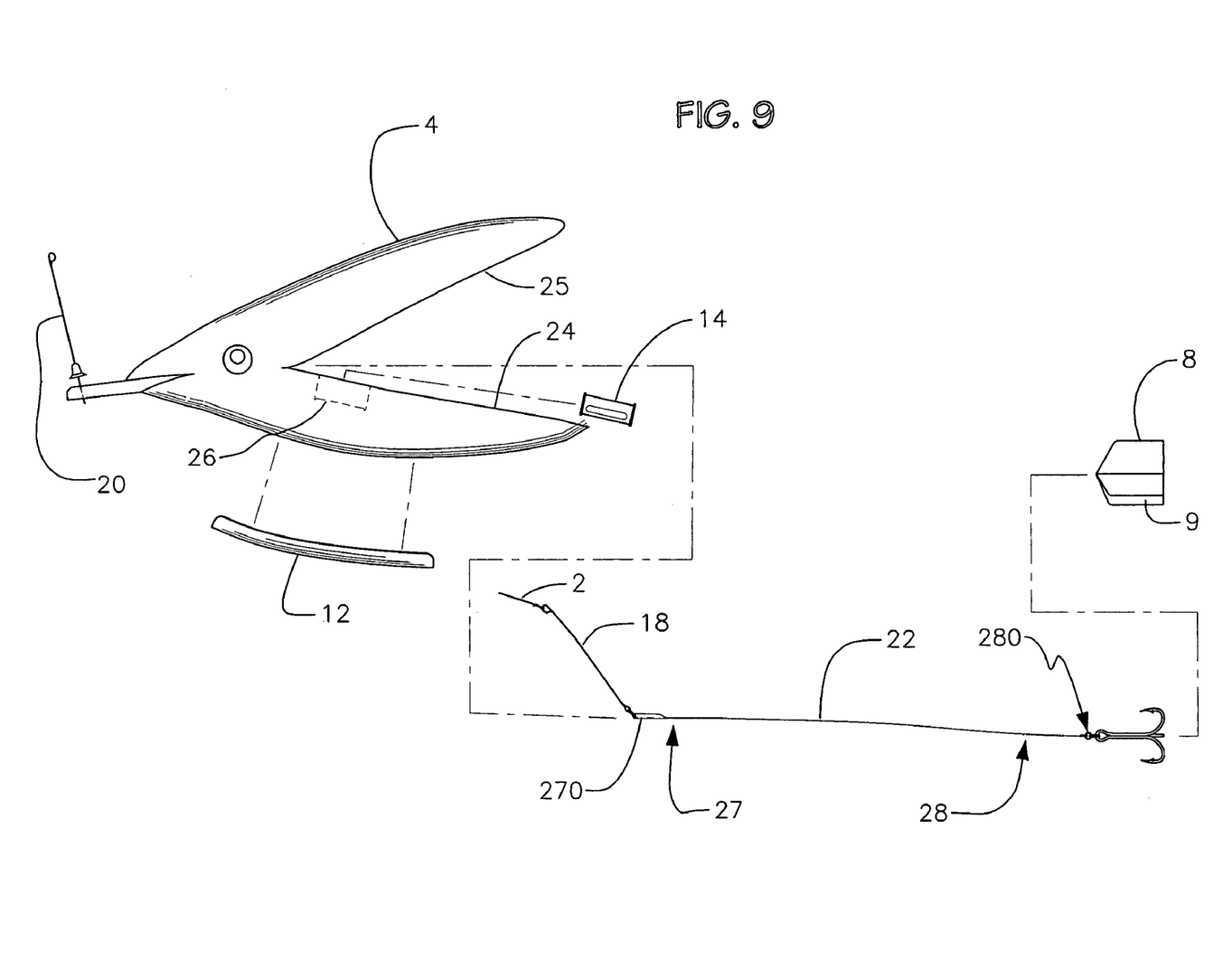
FIG. 9 illustrates the assembly of the four embodiments of the present invention.

Referring now to FIG. 9, the assembly of the first four embodiments of the present invention is shown. The upper body section 4 and the lower body section are molded as a single piece of flexible material such as a stiff foam rubber or pliable plastic, bifurcated for the installation of the bendable stay 22 and, in some embodiments, installation of the weight 14. In some embodiments, two pieces are used. A slit is left toward the front for accepting the diving tip 16 and the diving tip is bonded into the slit. In some embodiments, the bonding is done using an adhesive such as epoxy. In some embodiments, the weight 14 is inserted into the cavity 26 next. The bendable stay 22 is then pushed through a hole in the front section of the upper body section 4 of the adjustable fishing lure 10, providing enough clearance for the attachment of a fishing line or the line receiving wire 18. Now the upper body section 4 and the lower body section 6 are bonded by applying an adhesive such as contact cement to one or both inside surfaces 24/25 and applying force to hold them against each other. In some embodiments, a lower body weight 12 is bonded to the lower body section 6 using an adhesive such as epoxy. In some embodiments, the hook 9 with optional weed guard 8 is attached to the back end 28 of the bendable stay 22 which extends beyond the back end of the body of the adjustable fishing lure 10 with sufficient clearance as to expose the hook receiving loop 280. The line receiving wire 18 is attached to the line receiving loop 270 at the front end 27 of the bendable stay 22 which extends beyond the front end of the body of the adjustable fishing lure 10 with sufficient clearance. In some embodiments, the weed guard 20 is inserted through the diving lip 16 and attached to a loop in the line receiving wire 18. In some embodiments, the weed guard hat 30 is placed on the weed guard 20 before it is inserted through the diving lip 16.

Figure 10:
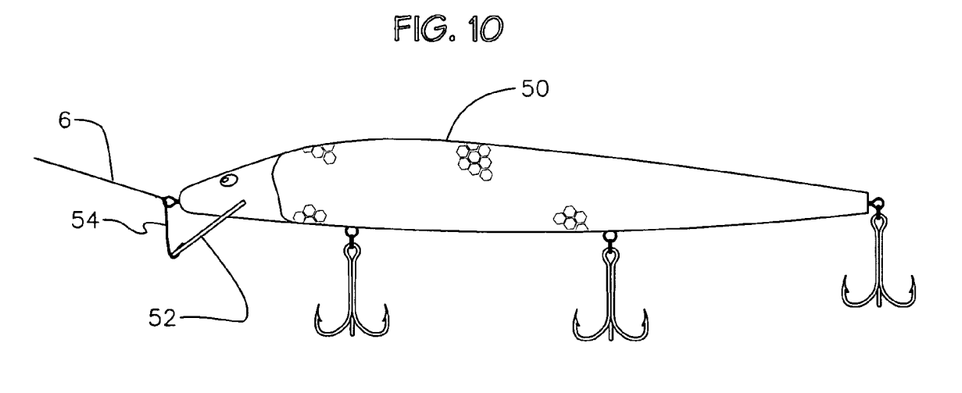
FIG. 10 illustrates a fishing lure of a fifth embodiment of the present invention.

Referring now to FIG. 10, a fishing lure 50 of a fifth embodiment of the present invention is shown. The fishing lure 50 has an action controlling surface 52, in this case a diving lip for helping to keep the lure beneath the water surface. In other embodiments, the action controlling surface 52 emanates from different surfaces of the fishing lure 50 and in some embodiments there are multiple action controlling surfaces 52. A fishing line 6 is attached to the fishing lure 50. As shown in the prior art in FIG. 2, weeds often catch between the fishing lure body 50 and the action controlling surface(s) 52, making the fishing lure 50 look less attractive to the target fish population. A weed guard wire or weed guard wires 54 blocks the gap between the fishing lure 50 and the action controlling surfaces 52, thereby reducing the opportunity for weeds to collect. In this embodiment, the weed guard wires 54 loop through the line attachment loop and pass through the action controlling surface 52, where they are bent to keep in place. In other embodiments, the weed guard wires 54 are clipped flush with the action controlling surface 52. In other embodiments, the clipped weed guard wires 54 are bonded in place on the action controlling surface either by welding or using a bonding agent such as epoxy.

Figure 11:
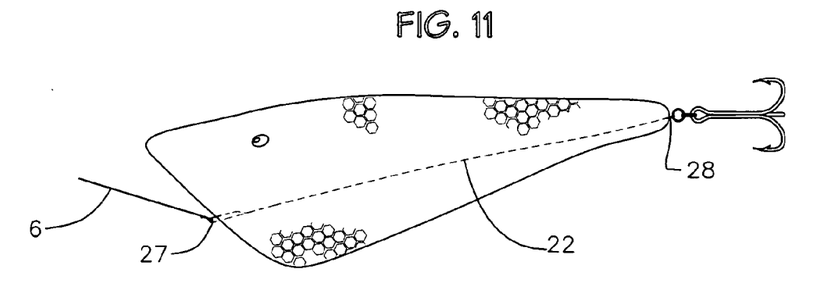
FIG. 11 illustrates a fishing lure of a sixth embodiment of the present invention.

Referring now to FIG. 11, a fishing lure 11 of a sixth embodiment of the present invention is shown. The fishing lure 11 has an action controlling surface 17, in this case an angular surface of the lure body, instead of a separate diving lip as in the previous embodiments. A fishing line 6 is attached to the fishing lure 11 at the line receiving loop 27. A hook 9 is attached to the hook receiving loop 28. As in the previous embodiments, a bendable stay 22 is disposed within the body of lure 11 so the body can be bent and remain in a bent position, thereby controlling the action of the lure 11.

Equivalent elements can be substituted for the ones set forth above such that they perform in substantially the same manner in substantially the same way for achieving substantially the same result.

It is believed that the system and method of manufacturing of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An adjustable fishing lure comprising:
   a lure body formed of a urethane foam and the lure body having a front end and a back end;
   a diving lip extending from the front end; and
   a one-piece, flat, metal bendable stay disposed substantially within and affixed to the lure body, the bendable stay having a first hole in an end extending beyond the front end of the lure body forming a line receiving loop and the bendable stay having a second hole in an end extending beyond the back end of the lure body forming a hook receiving loop, wherein the one-piece, flat, metal bendable stay has a twist of approximately 90 degrees said twist is located within the lure body, so the line receiving loop in a vertical direction and the hook receiving loop in a horizontal direction with respect to the lure body and, whereas the bendable stay provides for bending the lure body, the lure body maintaining a bent shape.

2. The adjustable fishing lure of claim 1, wherein the diving lip is bonded to the lure body.

3. The adjustable fishing lure of claim 1, further comprising at least one hook affixed to the hook receiving loop.

4. The adjustable fishing lure of claim 1, further comprising a lower body weight bonded to a bottom side of the lure body, wherein the lower body weight comprises a shiny material for attracting fish.

5. The adjustable fishing lure of claim 1, further comprising a weight disposed within a cavity within the lure body.

6. The adjustable fishing lure of claim 5, wherein the weight is in a hard plastic box containing a mass, the mass being free to move within the hard plastic box to make noise.

7. An adjustable fishing lure comprising:
   a lure body formed of a urethane foam, the lure body having a front end and a back end;
   at least one action controlling surface, the at least one action controlling surface is a diving lip; and
   a one-piece, flat, metal bendable stay having a approximately 90 degree twist, said twist is located within said lure body, whereby a forward portion of the one-piece, flat, metal bendable stay is substantially vertical with respect to the lure body and a rear portion of the one-piece, flat, metal, bendable stay is substantially horizontal with respect to the lure body, the one-piece, flat, metal bendable stay has a hole in a forward end forming a line receiving loop and the one-piece, flat, metal bendable stay has a hole in a rear end forming a hook receiving loop, the one-piece, flat, metal bendable stay disposed substantially within the lure body, whereas the one-piece, flat, metal bendable stay provides for bending the lure body, the lure body maintaining a bent shape.

8. The adjustable fishing lure of claim 7, having a lower body weight wherein the lower body weight is affixed to a bottom surface of the lure body, the lower body weight made of a shiny material for attracting fish.

9. The adjustable fishing lure of claim 7, further comprising a weight disposed within the lure body, wherein the weight is in a hard plastic box containing a mass, the mass being free to move within the hard plastic box to make noise.

10. The adjustable fishing lure of claim 7, wherein the bendable stay is made from bendable steel.

* * * * *